Nov. 10, 1931.  H. A. HICKS  1,830,901
AIRPLANE LANDING GEAR
Filed Oct. 22, 1930
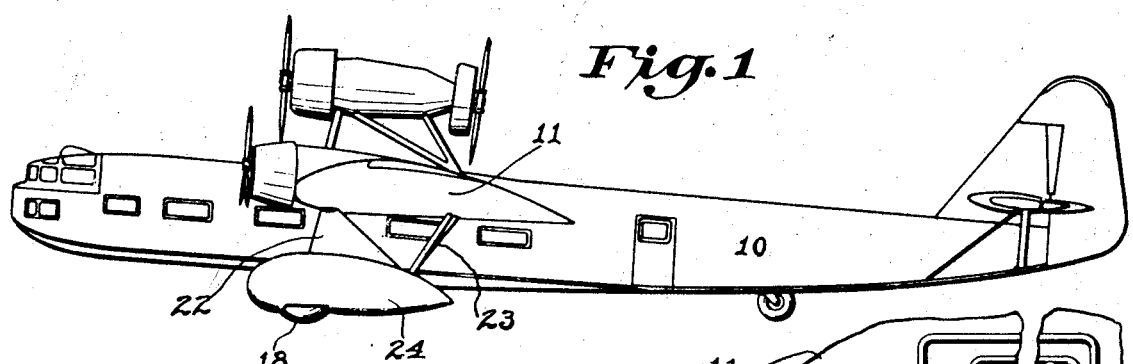
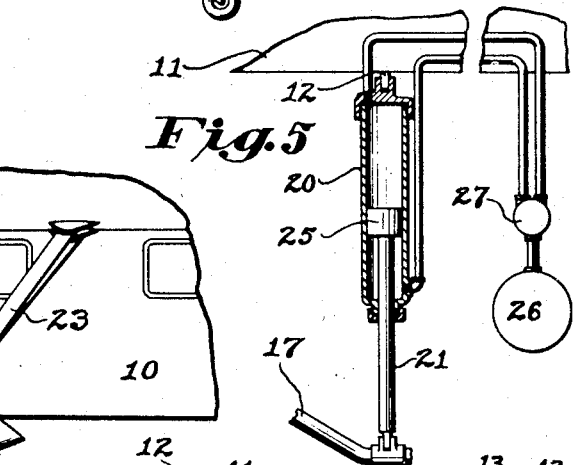
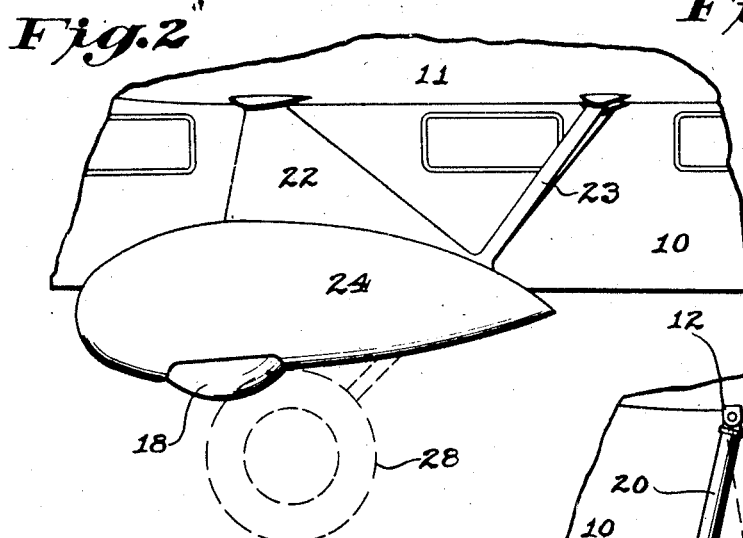
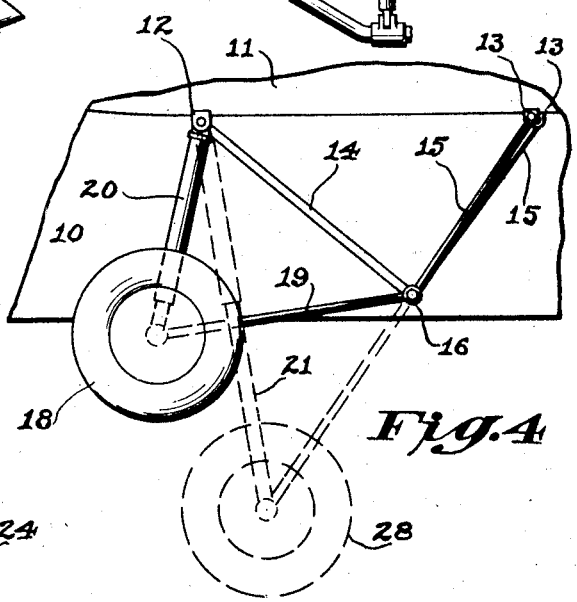
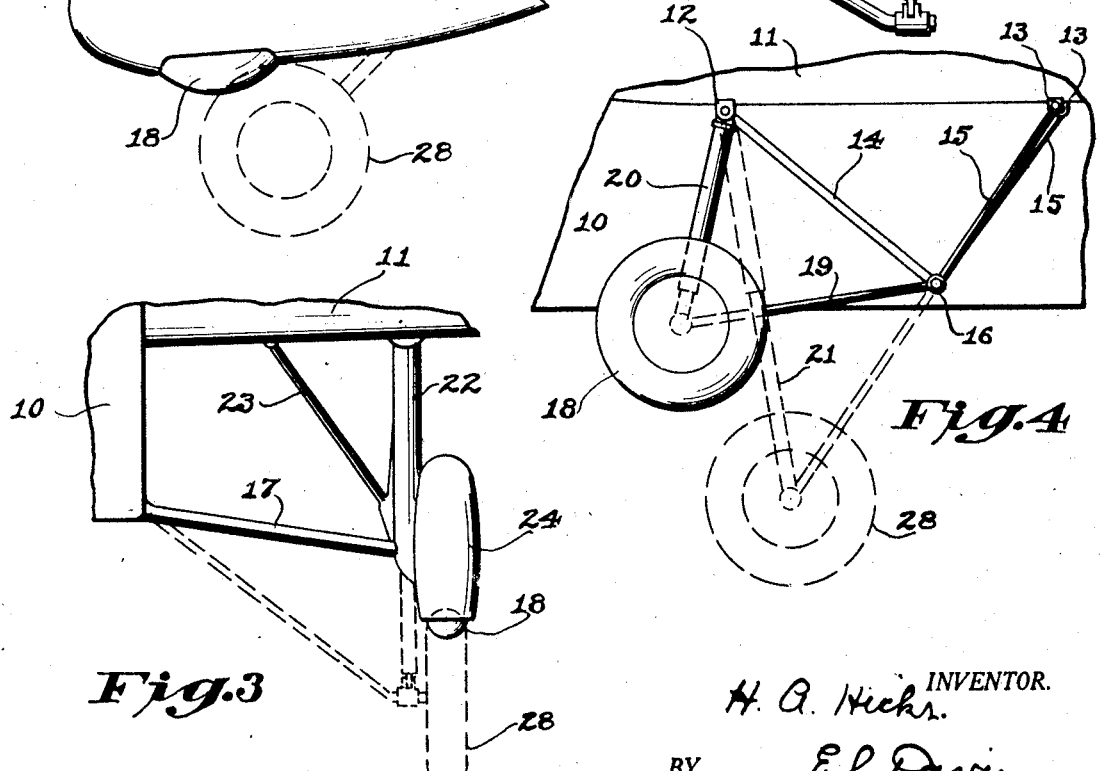
H. A. Hicks, INVENTOR.
BY E. L. Davis,
ATTORNEY.

Patented Nov. 10, 1931

1,830,901

UNITED STATES PATENT OFFICE

HAROLD A. HICKS, OF DETROIT, MICHIGAN, ASSIGNOR TO FORD MOTOR COMPANY, OF DEARBORN, MICHIGAN, A CORPORATION OF DELAWARE

AIRPLANE LANDING GEAR

Application filed October 22, 1930. Serial No. 490,481.

The object of my invention is to provide an airplane landing gear of simple, durable and inexpensive construction.

A further object of my invention is to provide an airplane landing gear which is efficiently streamlined to thereby offer a minimum air resistance. I accomplish this desirable result by providing a pair of streamlined wheel shrouds rigidly mounted beneath the airplane fuselage and provide landing wheels which may be operatively drawn up into these shrouds by the pilot when the plane is in the air.

When the plane is about to land the wheels are extended out of the shrouds a considerable distance below the fuselage. Thus, fouling of the shrouds when landing in muddy fields is prevented and further the wheels being extended out of the shrouds when the plane is at rest on the ground permits exceptionally easy tire changes or adjustment of the wheel brakes, which servicing has heretofore required the removal of the wheel shrouds when such shrouds were used.

Still a further object of my invention is to provide a landing gear in which the tread of the landing wheels is constant. The ordinary landing gear is so hinged to the fuselage that the wheels swing laterally in arcuate paths around the lower corners thereof to absorb the shock of the plane, which movement causes them to spread as the shock is absorbed. This spreading action increases the tread of the wheels on large planes so much as three or four feet which causes great damage to the tires and which is liable to rupture the wheels or force the tires completely off the wheels. In my improved structure the wheels swing in a pair of arcuate paths defining vertical planes parallel to the fuselage and to each other so that the tread of the wheels is constant under all conditions.

Still a further object of my invention is to provide a combined shock absorber and landing gear hoist whereby my landing wheels may be drawn up into their shrouds without any auxiliary apparatus. I provide a telescopic type shock absorber for each wheel, each shock absorber consisting of a cylinder having a piston therein. When the plane is at rest fluid under pressure is forced above the piston thereby extending the shock absorber and forcing the landing wheels out of their shrouds. After the plane is in the air the fluid pressure is released from the top of the piston and injected beneath same so that the landing wheels are then drawn up into the shrouds to thereby offer very little air resistance to the plane. A material increase in speed is obtained when this structure is used.

With these and other objects in view, my invention consists in the arrangement, construction and combination of the various parts of my improved device, as described in the specification, claimed in my claims, and illustrated in the accompanying drawings, in which:

Figure 1 shows a side elevation of an airplane in flight having my improved landing gear installed thereon.

Figure 2 shows an enlarged view of the landing gear shown in Figure 1, illustrating the extended and retracted positions of the landing wheel.

Figure 3 shows a front view of the landing gear shown in Figure 2.

Figure 4 shows a view of one of my improved landing wheels with the shroud and fairings removed to better illustrate the structure, and Figure 5 shows a diagrammatic view of my shock absorber, illustrating the method of operation thereof.

Referring to the accompanying drawings, I have provided an airplane having a fuselage 10 of the ordinary cabin type which is fastened beneath the center portion of a single wing 11 to form a high-wing monoplane type airplane. Extending from the under side of the wing 11 and spaced a considerable distance from each side of the fuselage 10, I have provided a pair of front clevises 12. Similarly, I have also provided two rear clevises 13 on each side of the fuselage which extend from the under side of the wing, each front clevis and pair of rear clevises being secured to the front and rear main longitudinal spars of the wing respectively. A brace 14 extends diagonally downwardly and rearwardly from each clevis 12, the lower end of each brace being joined to the lower ends of a pair of struts 15 which extend upwardly to the rear clevises 13. The joined lower ends of the brace 14 and struts 15 from fulcrums 16 around which the respective landing wheels pivot. It will be seen that each of the fulcrums 16 are thus rigidly held in a fixed position beneath the adjacent wing.

I have provided a pair of axles 17 extending outwardly and forwardly and downwardly from the two lower corners of the fuselage, the point of intersection of each axle and the fuselage being in substantial alignment with the pair of fulcrums 16. The outer end of each axle is provided with a landing wheel 18 rotatably mounted thereon and a strut 19, pivoted at each fulcrum 16, extends forwardly therefrom and connects with the respective axle 17 adjacent to its landing wheel 18. Thus, each of the axles 17, the wheels 18, and the struts 19 may pivot around the fulcrums 16.

An extensible shock absorber consisting of a pair of telescopic concentric upper and lower members 20 and 21, respectively, extend between each of the clevises 12 and the axle 17 adjacent to its landing wheel 18. To the upper end of each member 21 is secured a piston 25. Fluid under pressure in a suitable tank 26 within the fuselage is admitted through a valve 27 to the top of the pistons so that the shock absorbers are forced to their extended positions thereby lifting the airplane and pivoting the wheels 18 to the positions shown by the dotted lines 28. When the plane is landing or taking off the shock absorbers resiliently support the weight of the plane on these air cushions. With this type of shock absorber a long vertical travel for the wheels is easily provided so that the plane may be exceptionally well cushioned.

The shock absorbers 20 are further provided with means whereby the fluid under pressure in the tank 26 may be regulated by the valve 27 to telescope the shock absorbers thereby raising the wheels, axles, and struts 19 to their upper positions. The fluid is forced beneath the pistons 25 which, of course, forces the pistons into their cylinders 20.

Other types of extensible shock absorbers may be used, if desired, the one here illustrated being only one of numerous types suitable for use herein.

I have provided a pair of streamlined fairings 22, each of which encloses one of the clevises 12, shock absorbers 20 and braces 14. The streamlined fairings 23 enclose the struts 15 so that very efficient streamlining is provided in connection with my landing gear.

The feature of this device which is believed to be of novel construction and which contributes greatly to the efficiency of this landing gear consists of a pair of wheel shrouds 24 which are fixedly secured to the lower portions of the fairings 22. These shrouds are of streamline shape and form housings for the wheels 18. Openings 29 are provided in the lower portions of the shrouds 24 in which the landing wheels 18 may enter so that the wheels, when drawn to their upper positions, will be substantially enclosed by the shrouds 24. The shrouds being fixedly secured to the plane may be so designed that they offer very little air resistance.

When the plane is about to take off or land the shock absorbers are extended by the pilot thereby forcing the wheels out of their shrouds. When the wheels are in this position it is exceptionally easy to change the tires, adjust the brakes, or otherwise service the wheels which servicing would be difficult if the wheel shrouds were attached to the axles of the wheels, as is customary. Further, if such shrouds were attached to the wheel axles they would be in grave danger of becoming fouled when landings were made in muddy fields, which danger is entirely eliminated by my improved landing gear.

In my improved landing gear, the wheel shrouds are fixedly secured beneath the fuselage and the landing gear and the wheels arranged to be drawn up by the pilot into these shrouds when the plane is in flight.

Some changes may be made in the arrangement, construction and combination of the various parts of my improved device without departing from the spirit of my invention, and it is my intention to cover by my claims such changes as may reasonably be included within the scope thereof.

I claim as my invention:

1. An airplane landing gear comprising, a plurality of struts extending downwardly from the under surface of the airplane wing, a pair of fulcrums supported by said struts, one on each side of the airplane fuselage, a pair of landing wheels adapted to swing around said fulcrums, a pair of wheel shrouds fixedly secured beneath said wing by said struts, and fluid actuated shock absorbers extending between said wing and landing wheels to both absorb the landing impacts of the plane and operatively draw the landing wheels into said shrouds when the plane is in flight.

2. An airplane landing gear comprising, a fuselage having a wing extending from each side thereof, a plurality of struts extending downwardly from the under side of each wing, their lower ends being joined to form a pair of fulcrums, a pair of landing wheels adapted to swing in a pair of parallel vertical paths around said fulcrums, a pair of wheel shrouds fixedly secured beneath said wings by said struts, and fluid actuated shock absorbers extending between said wings and wheels for operatively drawing said wheels into said shrouds.

3. In an airplane landing gear, a wing, a pair of fulcrums supported beneath said wing, a pair of landing wheel shrouds supported beneath said wing, means for rotatably mounting landing wheels so that their axes will swing around said fulcrums into said shrouds and telescopic shock absorbers extending between said wheels and wings to both resist the swinging movement of said wheels and operatively draw the wheels into said shrouds.

HAROLD A. HICKS.